United States Patent
Ruzicka

(10) Patent No.: US 7,565,763 B1
(45) Date of Patent: Jul. 28, 2009

(54) SPLIT BOBBER DESIGNS

(76) Inventor: Emil Ruzicka, 2409 W. Carroll, Oak Creek, WI (US) 53154

( * ) Notice: Subject to any disclaimer, the term of this patent is extended or adjusted under 35 U.S.C. 154(b) by 0 days.

(21) Appl. No.: 12/028,658

(22) Filed: Feb. 8, 2008

Related U.S. Application Data

(62) Division of application No. 11/858,639, filed on Sep. 20, 2007, now Pat. No. 7,481,020.

(51) Int. Cl.
*A01K 93/00* (2006.01)
(52) U.S. Cl. .................................... 43/44.91
(58) Field of Classification Search ............... 43/44.87, 43/44.89, 44.9, 44.91, 43.14
See application file for complete search history.

(56) References Cited

U.S. PATENT DOCUMENTS

| | | | | | |
|---|---|---|---|---|---|
| 1,098,018 | A | * | 5/1914 | Cook | 403/353 |
| 2,526,031 | A | * | 10/1950 | Kocarek | 43/17.2 |
| 2,754,616 | A | | 7/1956 | Law | |
| 2,784,518 | A | * | 3/1957 | Boyer | 43/44.91 |
| 2,992,508 | A | * | 7/1961 | Schmidt | 43/44.91 |
| 3,107,451 | A | | 10/1963 | Sitzler et al. | |
| 3,241,262 | A | * | 3/1966 | Beverly | 43/44.91 |
| 4,449,318 | A | * | 5/1984 | Lane | 43/44.9 |
| 4,616,441 | A | * | 10/1986 | Dmytriw | 43/44.91 |
| 4,780,981 | A | * | 11/1988 | Hayward et al. | 43/44.89 |
| 5,131,183 | A | * | 7/1992 | Thayer et al. | 43/43.11 |
| 6,467,214 | B1 | * | 10/2002 | DeFrisco | 43/43.14 |
| 6,836,997 | B2 | * | 1/2005 | Cramsey | 43/43.14 |

* cited by examiner

*Primary Examiner*—Kurt Rowan
(74) *Attorney, Agent, or Firm*—Donald J. Ersler

(57) ABSTRACT

A dovetail split bobber includes a first bobber half and a second bobber half. A horizontally and/or vertically tapered male dovetail projection is formed on the first bobber half and a horizontally and/or vertically tapered female dovetail slot is formed in the second bobber half. The tapered female dovetail slot is sized to receive the tapered male dovetail slot. The split bobber is preferably a sphere, but may have any other suitable shape, such as a cylinder. A stuffed toy eye may be attached to opposing outside surfaces of the split bobber to create a rattling sound, when floating in a body of water. A Velcro split bobber includes a first bobber half and a second bobber half. A hook fastener pad is applied to the first bobber half and a loop fastener pad is applied to the second bobber half.

14 Claims, 6 Drawing Sheets

SPLIT BOBBER DESIGNS

CROSS-REFERENCES TO RELATED APPLICATIONS

This is a divisional patent application taking priority from Ser. No. 11/858,639 filed on Sep. 20, 2007 now U.S. Pat. No. 7,481,020.

BACKGROUND OF THE INVENTION

1. Field of the Invention

The present invention relates generally to fishing bobbers and more specifically to split bobber designs having structures that allow for quickly locking a fishing line between the opposing halves.

2. Discussion of the Prior Art

There are numerous types of split bobbers in the art. However, it appears that the state of the art does not disclose a split bobber having two halves that are secured to each with a tapered dovetail, or with hook and loop fasteners.

Accordingly, there is a clearly felt need in the art for a split bobber having a tapered dovetail connection, which quickly locks both halves to each other; a hook fastener applied to one bobber half and a loop fastener applied to the other bobber half; the option of being weighted; and the option of allowing the split bobber to slide relative to a fishing line.

SUMMARY OF THE INVENTION

The present invention provides split bobber designs having structures that allow for quickly locking the opposing halves. A dovetail split bobber includes a first bobber half and a second bobber half. A horizontally tapered male dovetail projection is formed on an inside surface of the first bobber half and a horizontally tapered female dovetail slot is formed in an inside surface of the second bobber half. The horizontally tapered female dovetail slot is sized to receive the horizontally tapered male dovetail slot. However, instead of the horizontally tapered male dovetail projection and the horizontally tapered female dovetail slot; a vertically tapered male dovetail projection may be formed on an inside surface of the first bobber half and a vertically tapered female dovetail slot may be formed in an inside surface of the second bobber half. Further, a combination of horizontally and vertically tapered male dovetail projection on the first bobber half and a combination horizontally and vertical tapered female dovetail slot may be created in the second bobber half.

The split bobber is preferably a sphere, but may have any other suitable shape, such as a cylinder. A lengthwise slot may be formed down a length of the tapered female dovetail slot to receive a fishing line. A lengthwise slit may also be formed down a length of the tapered male dovetail projection. The lengthwise slot or slit allows the split bobber to be slid relative to the fishing line. At least one weight cavity may be formed in an inside surface of either first or second halves to receive a weight. At least one weight cavity may also be formed in the male dovetail projection. A stuffed toy eye may be attached to opposing outside surfaces of the split bobber to create a rattling sound, when floating in a body of water.

A Velcro split bobber includes a first bobber half and a second bobber half. A hook fastener pad is applied to the first bobber half and a loop fastener pad is applied to the second bobber half. The first and second bobber halves are joined to each other by pushing the hook fastener pad into the loop fastener pad. A weight cavity may be formed in either or both bobber halves.

Accordingly, it is an object of the present invention to provide a split bobber including a tapered dovetail for locking both halves to each other.

It is a further object of the present invention to provide a split bobber including hook and loop fastening pads for securing both halves to each other.

It is yet a further object of the present invention to provide a split bobber including cavities for receiving weights.

Finally, it is another object of the present invention to provide a split bobber, which may be slid relative to a fishing line.

These and additional objects, advantages, features and benefits of the present invention will become apparent from the following specification.

DETAILED DESCRIPTION OF THE PREFERRED EMBODIMENTS

Figure 1:
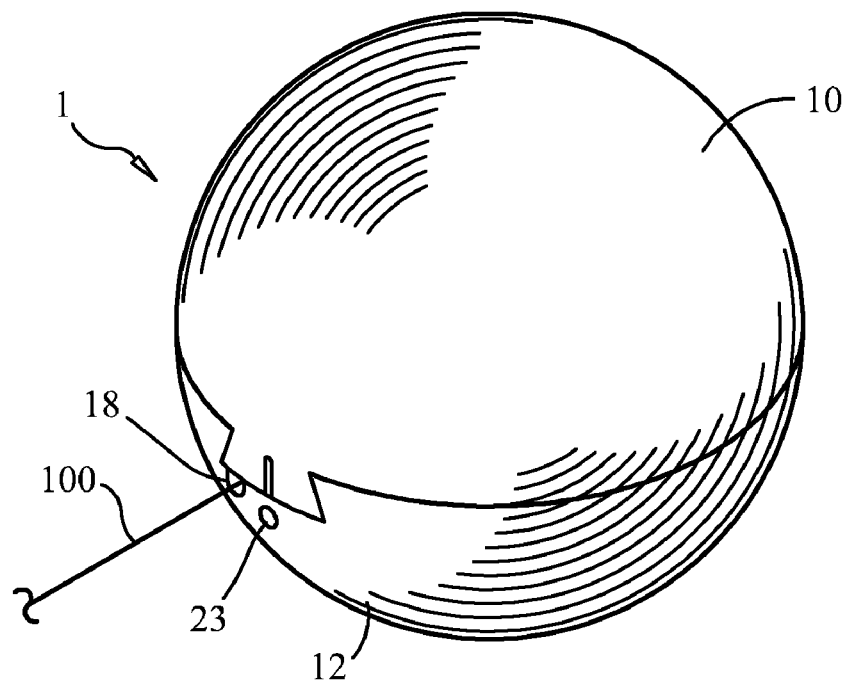
FIG. 1 is a perspective view of a spherical split bobber with an interlocking dovetail in accordance with the present invention.
Figure 3A:
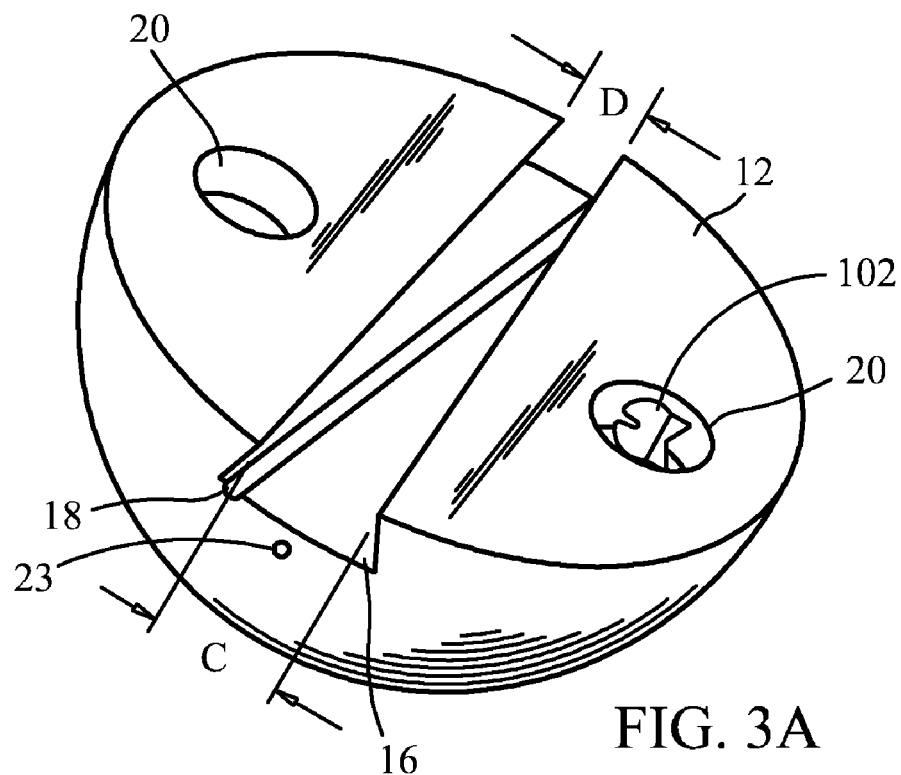
FIG. 3a is a perspective view of a second bobber half of a spherical split bobber illustrating a horizontally tapered female dovetail slot in accordance with the present invention.
Figure 3B:
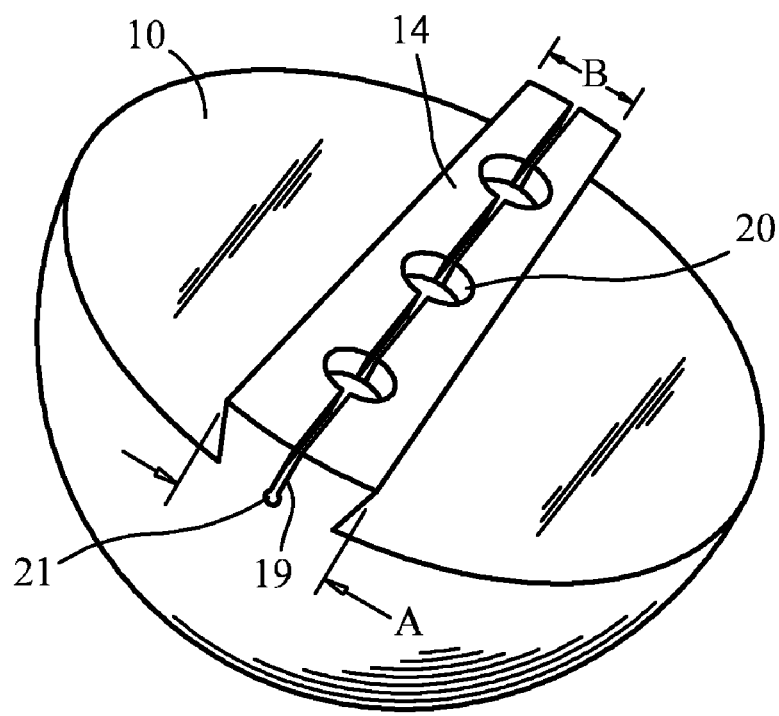
FIG. 3b is a perspective view of a first bobber half of a spherical split bobber with a lengthwise slit formed in a horizontally tapered male dovetail projection for allowing a fishing line to slip therethrough in accordance with the present invention.

With reference now to the drawings, and particularly to FIG. 1, there is shown a perspective view of a dovetail split bobber 1. With reference to FIGS. 3a-3b, the dovetail split bobber 1 includes a first bobber half 10 and a second bobber half 12. The split bobber 1 has a spherical shape. A horizontally tapered male dovetail projection 14 is formed on an inside surface of the first bobber half 10 and a horizontally tapered female dovetail slot 16 is formed in an inside surface of the second bobber half 12. The horizontally tapered female dovetail slot 16 is sized to receive the horizontally tapered male dovetail slot 16. The horizontally tapered male dovetail projection 14 includes a width "A," which is greater than a width "B." The tapered female dovetail slot 16 includes a width "C," which is greater than a width "D."

The first and second bobber halves are preferably fabricated from a closed cell foam, but other appropriate materials may also be used. A lengthwise slot 18 may be formed down a length of the tapered female dovetail slot 16 to receive a fishing line 100. A lengthwise slit 19 is formed in the horizontally tapered male dovetail projection 14. The lengthwise slit 19 is preferably terminated with a slit relief 21. The lengthwise slot 18 and the lengthwise slit 19 allow the split bobber 1 to be slid relative to the fishing line 100. A line hole 23 may be formed through the second bobber half 12 to receive a fishing line 100.

At least one weight cavity 20 may be formed in an inside surface of either or both of the first or second halves to receive a weight 102. At least one weight cavity 20 may also be formed in the male dovetail projection 14. A fishing line 100 may be axially retained in the first bobber half 10 by inserting the weight 102 attached to the fishing line 100 into one of the at least one weight cavity 20; or at least one weight 102 may be retained in the at least one weight cavity 20 in the male dovetail projection 14. The first and second bobber halves are secured to each other and to a fishing line 100, when the first and second bobber halves are slid together. A friction fit between the tapered male dovetail projection 14 and the tapered female dovetail slot 16 keeps the first and second bobber halves together.

Figure 4:
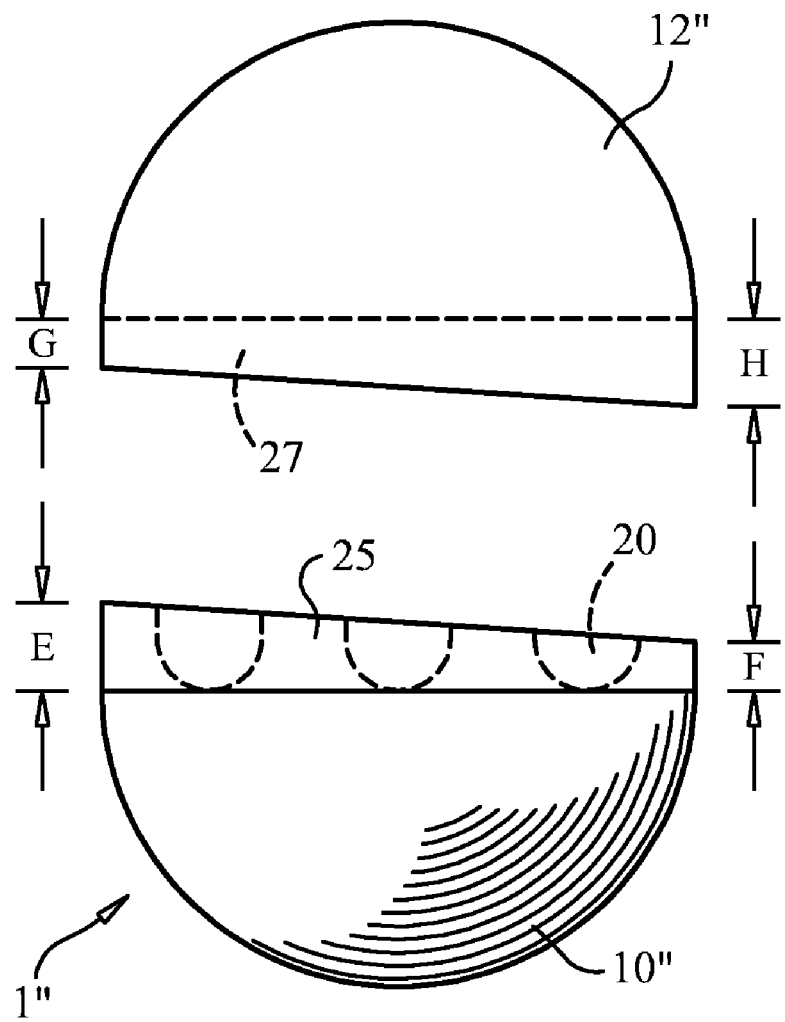
FIG. 4 is an exploded side view of a substantially spherical split bobber with a vertically tapered dovetail in accordance with the present invention.

With reference to FIG. 4, instead of the horizontally tapered male dovetail projection 14 and the horizontally tapered female dovetail slot 16; a vertically tapered male dovetail projection 25 may be formed on an inside surface of the first bobber half 10" and a vertically tapered female dovetail slot 27 may be formed in an inside surface of the second bobber half 12". The vertically tapered female dovetail slot 27 is sized to receive the vertically tapered male dovetail projection 25. The vertically tapered male dovetail projection 25 includes a height "E," which is greater than a height "F." The vertically tapered female dovetail slot 16 includes a height "H," which is greater than a height "G." Additionally, a combination of a horizontally and vertically tapered male dovetail projection may be created on the first bobber half 10 and a combination of a horizontally and vertically tapered female dovetail slot may be created in the second bobber half 12.

Figure 5:
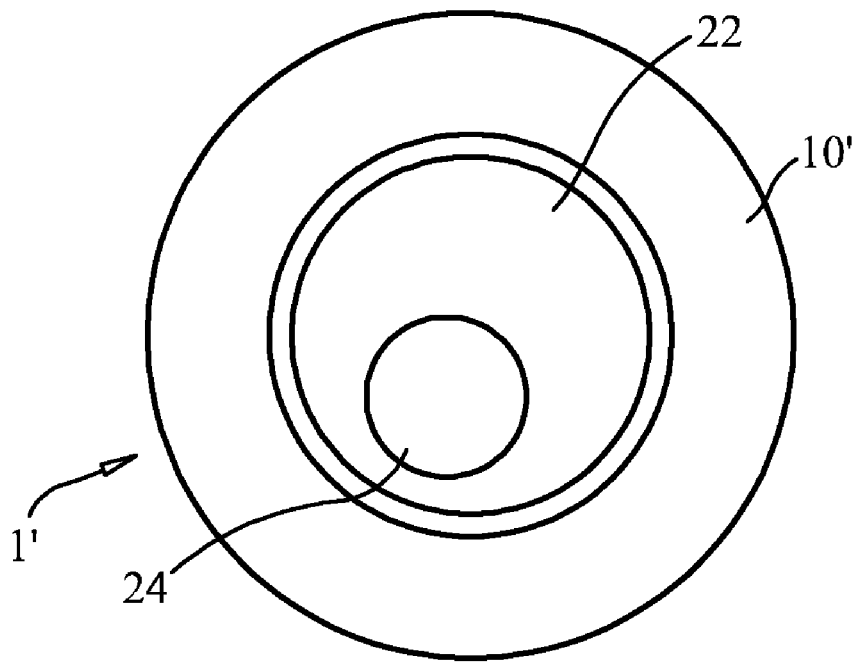
FIG. 5 is a top view of a substantially spherical split bobber with a stuffed toy eye attached to opposing outside surfaces in accordance with the present invention.
Figure 6:
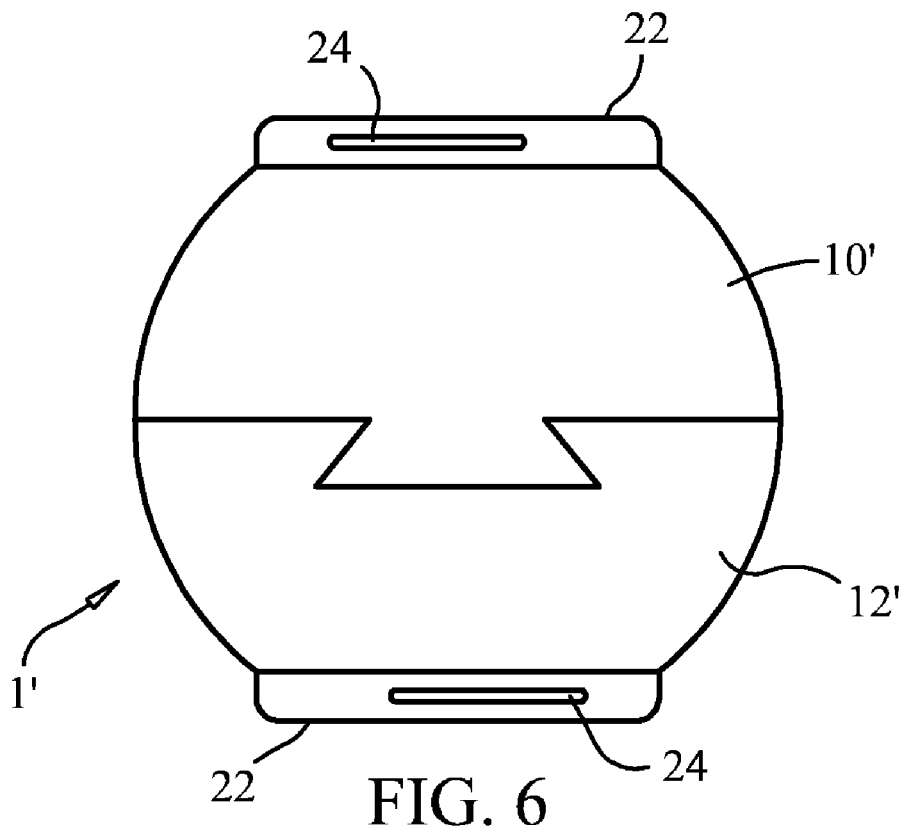
FIG. 6 is a side view of a substantially spherical split bobber with a stuffed toy eye attached to opposing outside surfaces in accordance with the present invention.
Figure 7:
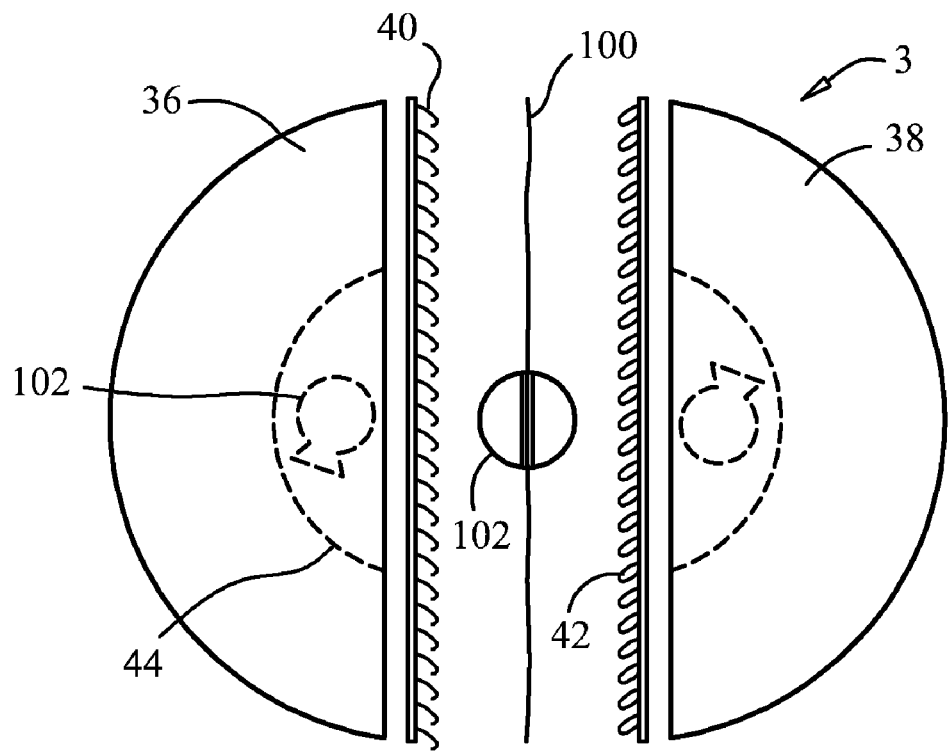
FIG. 7 is an exploded side view of Velcro split bobber in accordance with the present invention.
Figure 8:
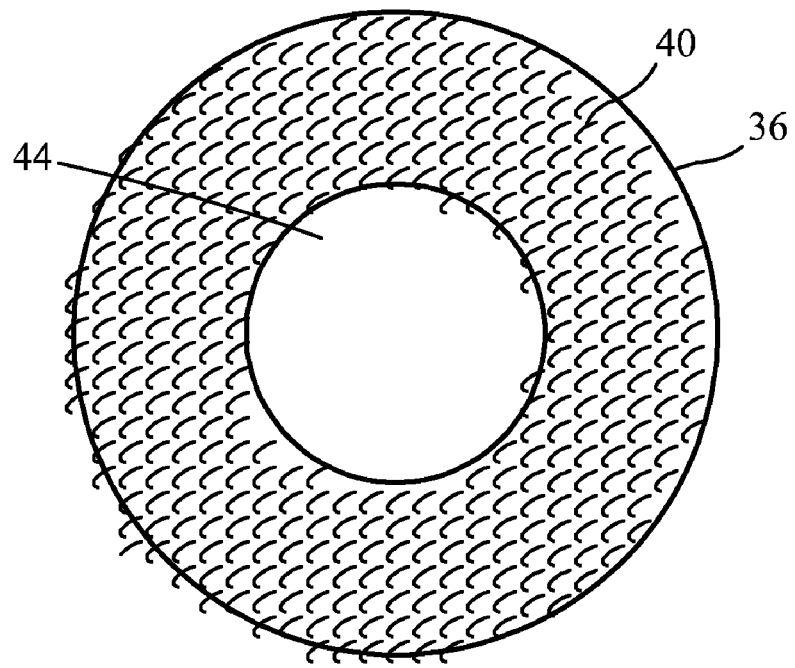
FIG. 8 is an inside end view of Velcro split bobber half in accordance with the present invention.
Figure 11:
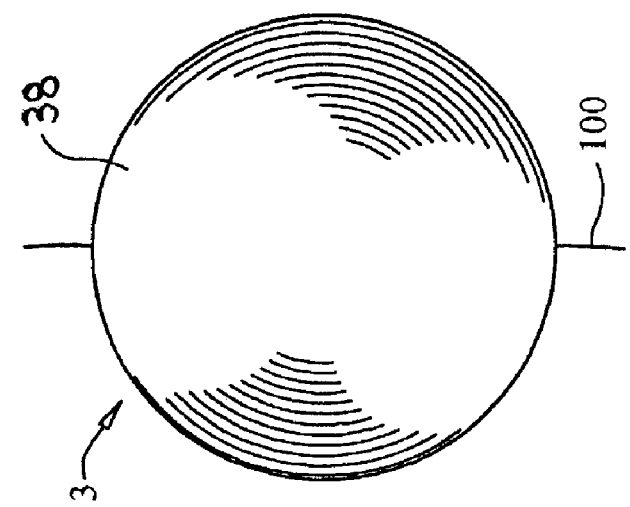
FIG. 11 is a side view of an assembled Velcro split bobber rotated 90 degrees from that of FIG. 10 in accordance with the present invention.
Figure 10:
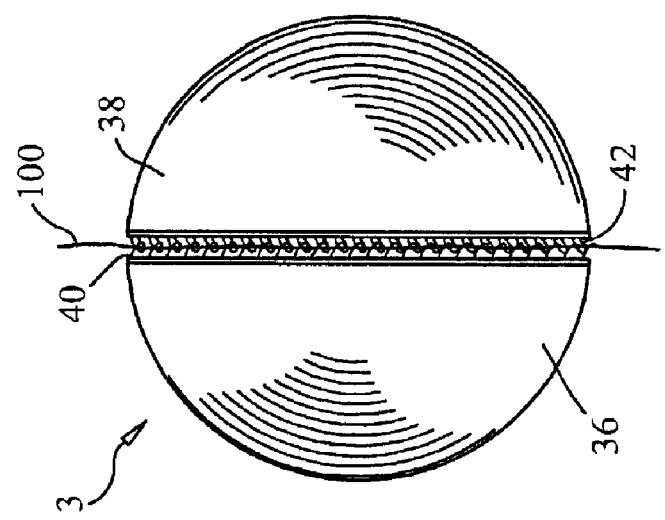
FIG. 10 is a side view of an assembled Velcro split bobber in accordance with the present invention.
Figure 9:
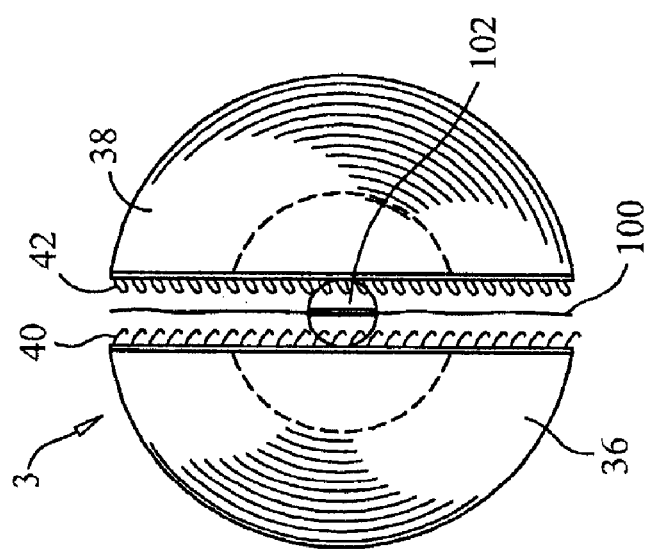
FIG. 9 is a partially exploded side view of Velcro split bobber in accordance with the present invention.

With reference to FIGS. 5-6, a stuffed toy eye 22 may be attached to an outside surface of at least one of a first bobber half 10' and a second bobber half 12' of the split bobber 1'. A portion of the outside surface of the first and/or second bobber halves is removed to mount the stuffed toy eye 22. Movement of an eye element 24 in the stuffed toy eye 22 causes a rattling sound, when floating in a body of water. Any portion of the stuffed toy eye 22 may be fluorescent.

Figure 2:
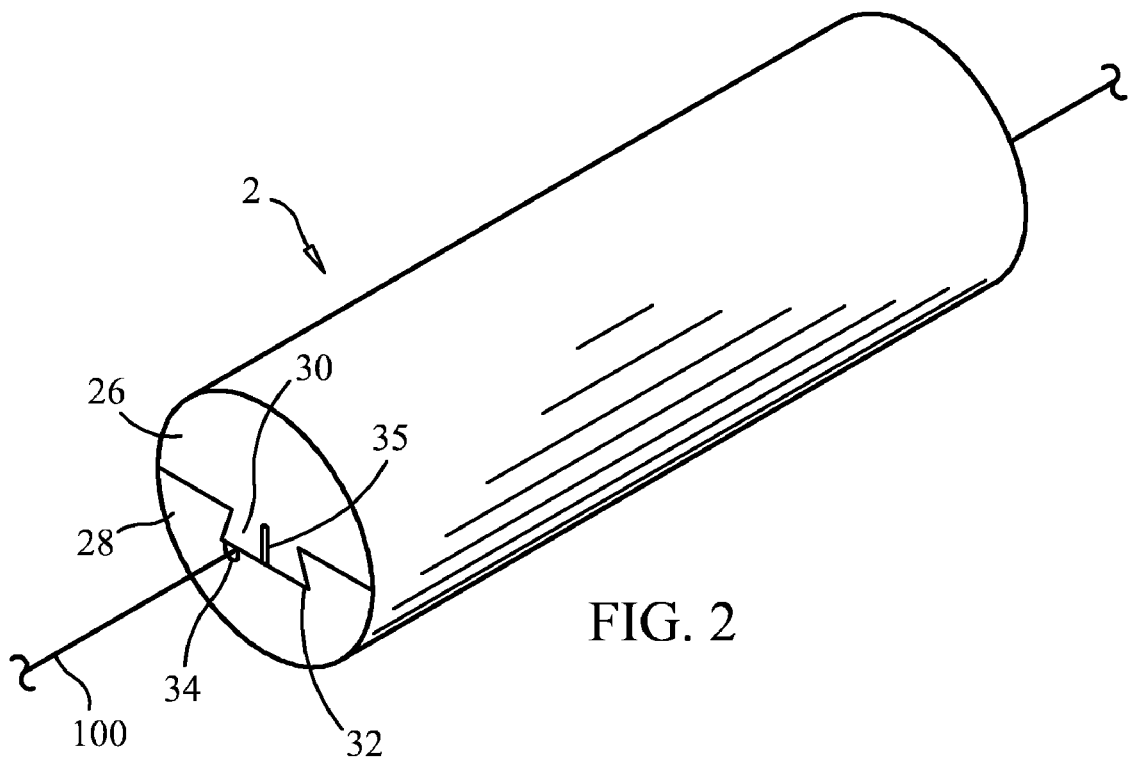
FIG. 2 is a perspective view of a cylindrical split bobber with an interlocking dovetail in accordance with the present invention.

With reference to FIG. 2, a split bobber 2 includes a first bobber half 26 and a second bobber half 28. A tapered male dovetail projection 30 is formed on an inside surface of the first bobber half 26 and a tapered female dovetail slot 32 is formed in an inside surface of the second bobber half 28. The tapered female dovetail slot 32 is sized to receive the tapered male dovetail projection 30. The tapered male dovetail projection 30 and the tapered female dovetail slot 32 have the same structure as the tapered male dovetail projection 14 and the tapered female dovetail slot 16, respectively. The tapered male dovetail projection 30 may be horizontally or vertically tapered and the tapered female dovetail slot 32 may be horizontally or vertically tapered. A lengthwise slot 34 may be formed down a length of the tapered female dovetail slot 32 to receive the fishing line 100. A lengthwise slit 35 may be formed in the tapered male dovetail projection 30. At least one weight cavity 20 may be formed in either the first or second bobber half or the tapered male dovetail projection 30.

With reference to FIGS. 7-11, a Velcro split bobber 3 includes a first bobber half 36 and a second bobber half 38. A hook fastener pad 40 is attached to an inside surface of the first bobber half 36 and a loop fastener pad 42 is attached to the second bobber half 38. However, the hook fastener pad 40 could also be applied to the second bobber half 38 and the loop fastener pad 42 applied to the first bobber half 36. The hook fastener pad 40 and loop fastener pad 42 are attached to the first bobber half 36 and the second bobber half 38 with pressure sensitive adhesive or any other suitable method. The first and second bobber halves are joined to each other by pushing the hook fastener pad 40 into the loop fastener pad 42. A weight cavity 44 may be formed in either or both of the bobber halves to receive a loose weight 102 or a weight 102 secured to the fishing line 100. The Velcro split bobber 3 is shown as having a substantially spherical shape, but could have any other appropriate shape, such as substantially cylindrical as shown in FIG. 2.

Any part of the dovetail split bobbers 1, 2 may be fluorescent.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A split bobber comprising:
two bobber halves;
a hook fastener pad being secured to a flat inside surface of one of said two bobber halves, said hook fastener pad covering substantially all of said flat inside surface;
a loop fastener pad being secured to a flat inside surface of the other one of said two bobber halves, said loop fastener pad covering substantially all of said flat inside surface, said two bobber halves being retained relative to each other by pressing said hook fastener pad against said loop fastener pad; and
a fishing line being retained between said hook and loop fastener pads, the fishing line being in contact with said hook and loop fastener pads when said two bobber halves are assembled, said two bobber halves remaining assembled during use.

2. The split bobber of claim 1 wherein:
said split bobber having a spherical shape.

3. The split bobber of claim 1, further comprising:
a stuffed toy eye being attached to at least one of said first and second bobber halves.

4. The split bobber of claim 1 wherein:
at least one weight cavity being formed on an inside surface of at least one of said first and second bobber halves.

5. The split bobber of claim 4, further comprising:
at least one weight being secured to the fishing line and retained in said at least one weight cavity.

6. A split bobber comprising:
two bobber halves, at least one of said two bobber halves being solid;
a hook fastener pad being secured to a flat inside surface of one of said two bobber halves;
a loop fastener pad being secured to a flat inside surface of the other one of said two bobber halves, said loop fastener pad covering substantially all of said flat inside surface, said two bobber halves being retained relative to each other by pressing said hook fastener pad against said loop fastener pad; and a fishing line being retained between said hook and loop fastener pads, the fishing line being in contact with said hook and loop fastener pads when said two bobber halves are assembled, said two bobber halves remaining assembled during use.

7. The split bobber of claim 6 wherein:

said split bobber having a spherical shape.

8. The split bobber of claim 6, further comprising:

a stuffed toy eye being attached to at least one of said first and second bobber halves.

9. The split bobber of claim 6 wherein:

at least one weight cavity being formed on an inside surface of at least one of said first and second bobber halves.

10. The split bobber of claim 9, further comprising:

at least one weight being secured to the fishing line and retained in said at least one weight cavity.

11. A split bobber comprising:

two bobber halves;

at least one weight cavity being formed in a flat inside surface of at least one of said first and second bobber halves, said at least one weight cavity not occupying substantially all of said flat inside surface of said at least one of said first and second bobber halves;

a hook fastener pad being secured to said flat inside surface of one of said two bobber halves, said hook fastener pad covering substantially all of said flat inside surface;

a loop fastener pad being secured to said flat inside surface of the other one of said two bobber halves, said loop fastener pad covering substantially all of said flat inside surface, said two bobber halves being retained relative to each other by pressing said hook fastener pad against said loop fastener pad; and a fishing line being retained between said hook and loop fastener pads, the fishing line being in contact with said hook and loop fastener pads when said two bobber halves are assembled, said two bobber halves remaining assembled during use.

12. The split bobber of claim 11 wherein:

said split bobber having a spherical shape.

13. The split bobber of claim 11, further comprising:

a stuffed toy eye being attached to at least one of said first and second bobber halves.

14. The split bobber of claim 11, further comprising:

at least one weight being secured to the fishing line and retained in said at least one weight cavity.

* * * * *